Figure 3:
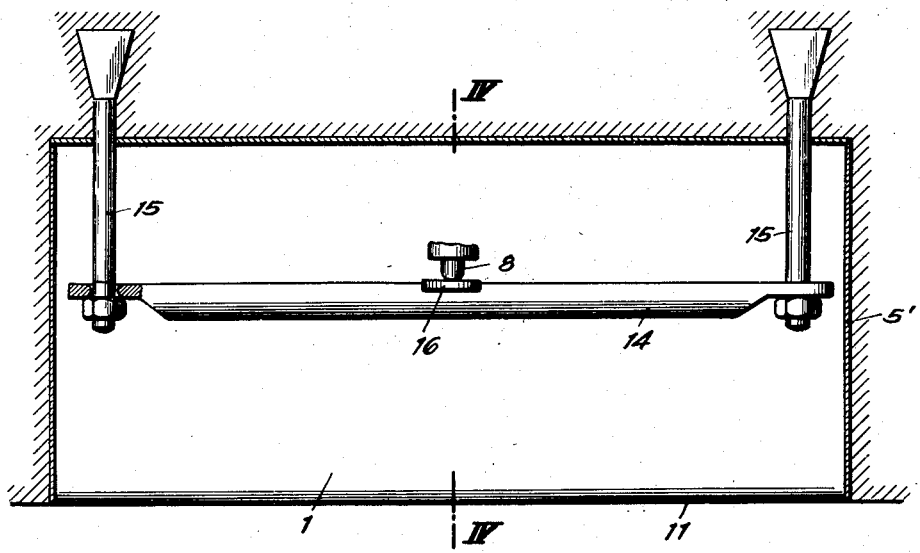

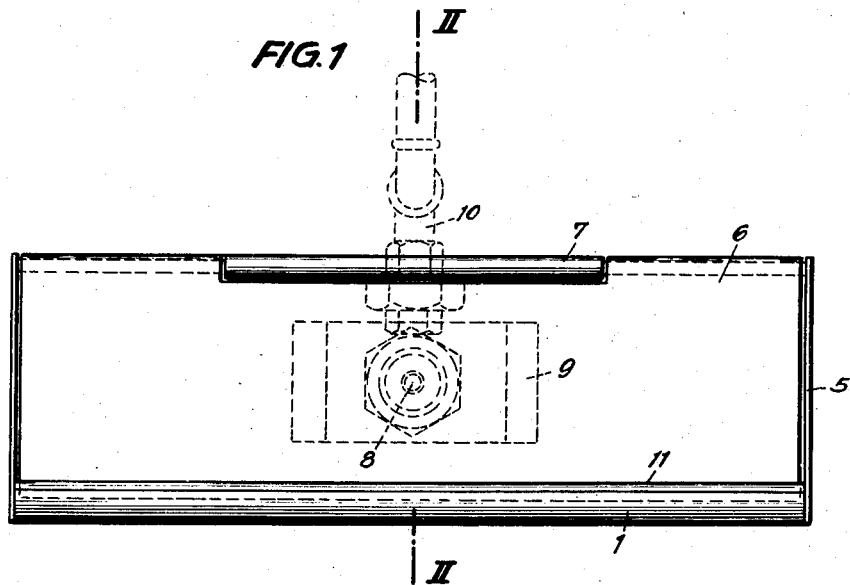
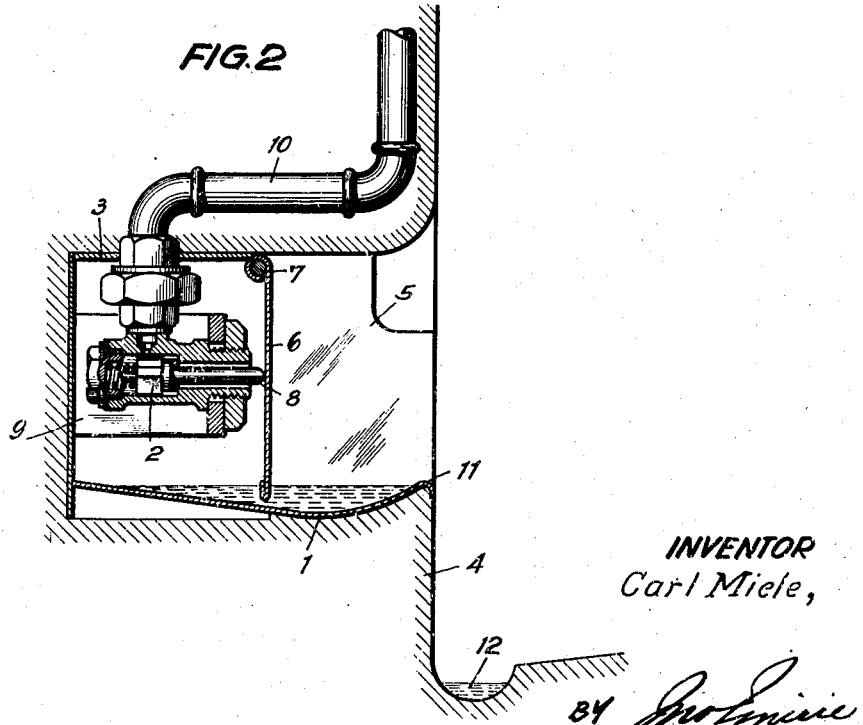

INVENTOR
Carl Miele,

Feb. 22, 1955 C. MIELE 2,702,527
AUTOMATIC DRINKING TROUGH, MORE PARTICULARLY FOR PIGS
Filed April 2, 1951 3 Sheets-Sheet 3
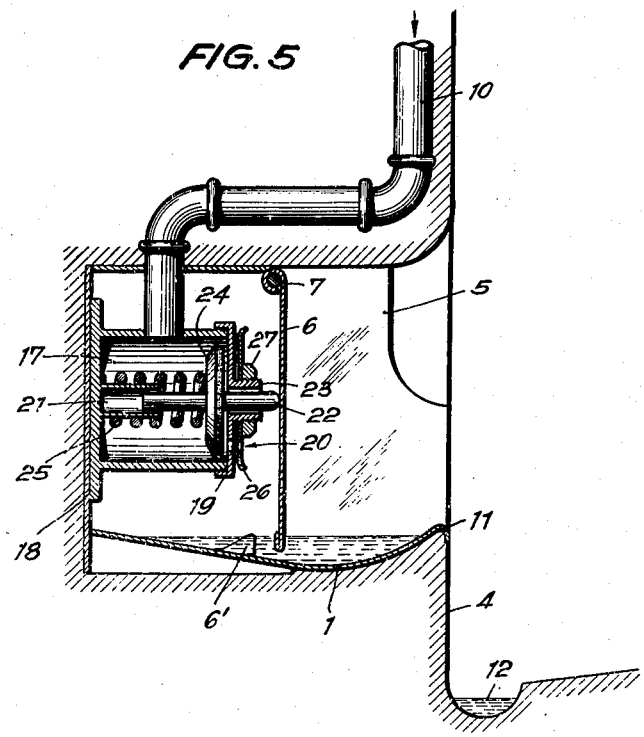
INVENTOR
Carl Miele,

# United States Patent Office 2,702,527
Patented Feb. 22, 1955

2,702,527

AUTOMATIC DRINKING TROUGH, MORE PARTICULARLY FOR PIGS

Carl Miele, Gutersloh (Westphalia), Germany

Application April 2, 1951, Serial No. 218,736

Claims priority, application Germany February 20, 1951

2 Claims. (Cl. 119—75)

Automatic drinking troughs for animals provided with a valve operated by water pressure are already known in which the stem of the valve can be operated by the animal in order to open the valve. These known automatic troughs provided with a pivoted controlling flap are intended for horses and cows and are unsuitable for pigs, since they are open at the top and are easily exposed to pollution and since the troughs owing to their high side walls are accessible only with difficulty and the controlling members for opening the valve can be reached by the pigs only with difficulty. Pigs, fattening pigs, pregnant sows, on the other hand are very thirsty, especially in the high summer season. The object of the invention is to provide automatic drinking troughs with an easily accessible valve operated by water pressure intended more particularly for pigs, the trough of which is greatly protected against pollution and is substantially automatically cleaned by the action of the animal. So far as possible the animal should partake of fresh water.

According to the invention automatic drinking troughs of the kind above referred to are built in the wall of a sty and are provided with a flat trough which is automatically cleaned by the water pressure released through the valve. The animal thus carries out a double task. It takes care of the supply of fresh water into the trough and at the same time it ensures that the fresh water in the trough pushes so far as possible out of the trough any water that may have been stagnant therein and foreign matter. The automatic drinking troughs are preferably provided over the discharge gutter of the liquid manure of the sty or at least in its immediate proximity. In order to build the automatic drinking troughs in the wall of the sty a recess is provided in a flat wall of the sty. If this is too difficult a piece of masonry is built up in front of the wall in which the trough is then built in and in such a manner that it is completely covered by the wall on its outer sides. The trough is so built in that it is completely covered by the sty wall. This construction and the comparatively small dimension of the automatic drinking trough are intended to prevent the pigs from jumping into the trough, even only with their front feet, and thereby polluting it. In order to prevent that the water will flow into the wall of the sty and make it damp the water pressure valve is preferably mounted in a casing which is inserted into the wall and is made water-tight. According to the invention the bottom of the casing is flat and serves as a drinking basin covered by the sty wall. The insertion of the casing into the recess provided in the sty wall or the masonry for the insertion of the casing may be carried out in a simple and quick manner by a mason. However, it is also possible to dispense with the casing. In this case the water valve, the controlling member for opening the valve and the drinking basin may be built with good cement and in a clean manner into the recess of the sty wall.

Figure 4:
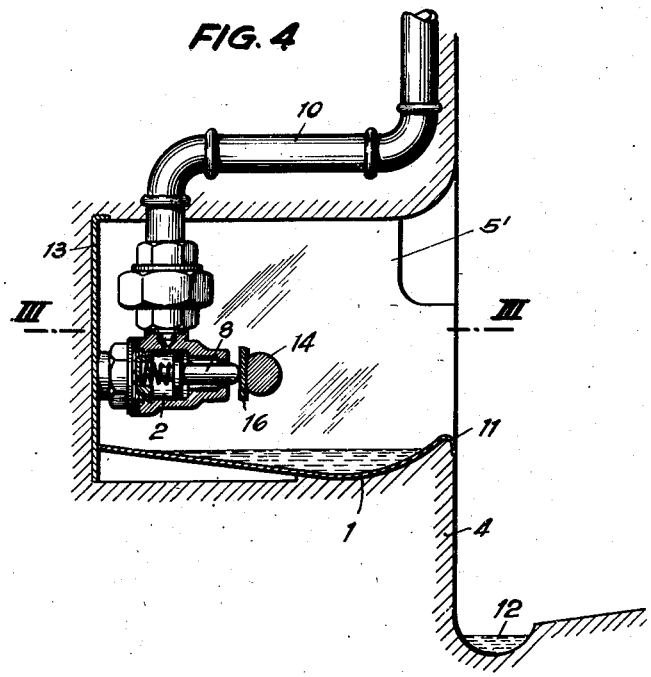

In the case of the present automatic drinking trough a certain amount of water will always overflow. In order to avoid excessive waste of fresh water it is advisable to provide a device on the water pressure valve by means of which the water flowing into the basin is regulated. The operation of such a device can be effected easily and quickly since the water pressure valve is easily accessible in all cases. One such construction may consist in that at the water outlet of the valve there are arranged as coaxially as possible two rings with approximately the same size of holes at least one of which can be rotated from the outside. By covering more or less the holes in the one ring with the holes of the other ring the desired throttling of the inlet of fresh water can be easily effected. Examples of construction according to the invention are illustrated in the accompanying drawing, in which:

Figure 1 is a front view of an automatic drinking trough built in a sty wall;
Figure 2 is a section along the line 2—2 of Figure 1;
Figure 3 is a section along the line 3—3 of Figure 4, and
Figure 4 is a section along the line 4—4 of Figure 3.
Figure 5 is a section of another construction.

The automatic drinking trough is built at a small height, about 25 cm., over the sty floor in the sty wall so that it can be easily reached by pigs and young pigs. The size of the recess in the sty wall and the parts of the automatic drinking trough are adapted to the size of the pigs. The front opening of the recess lies in the plane of the wall. Parts of the automatic trough projecting into the interior of the sty are avoided in order that the drinking basin 1, which is kept flat can be covered by the sty wall and a jumping-in of the animals is avoided as much as possible. The valve 2 is mounted in a casing 3 which is suitably inserted in the recess provided in the sty-wall 4. The flat drinking basin 1 forms the bottom of this water-tight casing and lies with its bent front edge and its flat bent part on the masonry. The side walls 5 are carried further up in order to prevent as much as possible a penetration of the water into the masonry over the upper edges of these parts. A pivoted or pressure flap 6 is rotatably suspended in the casing in front of the water valve. This pivoted flap hangs vertically without touching the valve stem 8, in the position of rest. It may also be so arranged that in the position of rest it touches the valve stem only lightly. The valve 2 is mounted in the casing on a stationary support 9 and is connected to water pressure pipe 10 mounted in the masonry of the sty wall. At the outlet of the water from the valve there is preferably provided a device for regulating the desired amount of fresh water. The pressure of the outgoing fresh water is so great that this water forced into the drinking basin pushes the water standing therein and any dirt particles that may be present over the front edge 11 of the basin out of it thereby cleaning the basin. The construction may be such that the outlet of the fresh water is distributed over the length of the basin and that the fresh water flows out in a direction transverse to the basin and approximately parallel to its bottom without narrowing the access to the valve. By turning the pivoted flap upwards towards the interior of the sty, which can easily be done, the valve can easily be reached for any possible regulation of the inflowing amount of water or for repairing purposes and also the basin can easily be cleaned. 12 is the discharge gutter for the liquid manure arranged underneath the automatic trough in the floor of the sty.

In the construction according to Figures 3 and 4 the valve connected to the house water pipe 10 is mounted in a stationary position in the casing 13, the upper covering wall of which is dispensed with. Also in this case the flat basin 1 forms the lower bottom of the casing. Instead of a pivotally suspended flap a pressure rod 14 is provided which is displaceably mounted on stationary pins 15. In this construction the access to the valve and the basin is increased as compared with the construction according to Figures 1 and 2. The pressure rod is provided at a flattened portion thereof with a small pressure plate 16 which engages with the valve stem 8. Alternatively the plate 16 may be provided on the stem 8. When the pigs lean against the pressure rod 14 and push the stem 8 against its spring action the valve 2 is opened so that the pressure liquid flows into the flat drinking basin 1. The construction according to Figures 3 and 4 can otherwise be the same as that shown in Figures 1 and 2.

Figure 5 shows an automatic drinking trough, built in the wall, the water-pressure pipe 10 of which is tightly fitted in a round, angular or whatever formed box 17, fastened on the back-wall 18 of the casing mounted in the masonry. On this box a cap 19 is screwed, provided with holes 20. On the bottom of box 17 a guide-tube 21 is fastened. Into this guide-tube 21 fits the valve-stem 22, which is carried through guide-socket 23, fastened on screw-cap 19, and which is bearing the valve-disk 24. The valve-disk 24 is pressed against the screw-cap 19 by a spiral spring 25, which shuts off the holes 20. In case of need one of the touching surfaces of valve-disk 24 or screw-cap 19 can be provided with a packing-disk, in order to make the shutting off between valve-disk 24 and screw-cap 19 as tight as possible. Besides the spring 25 is the water-pressure inside the box 17, which provides for a tight pressing of the valve-disk 24 against the screw-cap 19. On the guide-socket 23 is seated rotatably a disk 26, which has holes corresponding to the holes 20 and which can be brought through rotation in such a position, that the holes of disk 26 will correspond with the holes of screw-cap 19 or will cover them partly. This supply of fresh water into the drinking basin can be throttled at every request. The disk 26 can also be provided with handles to be turned with. In order to prevent an involuntary removal of the adjusted disk 26 through the pressure of the water a clamping nut 27 is put on the guide-socket 23. After loosening nut 27 the holes of disk 26 can be adjusted against the holes 20 of screw-cap 19 in the required way. For the pressure flap 6, suspended by 7, stops 6' are provided, in order to prevent that the pressure flap 6 may be pressed too far towards the valve.

The embodiments of the invention in which an exclusive property or privilege claimed are defined as follows:

1. In combination with an animal pen having a masonry floor and wall with a gutter in the floor at the foot of the wall and a recess in the wall and spaced above said floor, an automatic watering mechanism including an animal operable water inlet mechanism in a casing mounted in said recess and embedded completely in said wall, said casing having a bottom wall formed as a shallow trough extending to the front of said recess to readily overflow into said gutter and thereby provide relatively clean fresh water in said trough, said casing is watertight to prevent dampening said wall and said animal operable water inlet mechanism comprises a flap pendent in said casing to be swung by an animal to operate the water inlet mechanism, and stop means extending up from said trough to limit swinging of said flap.

2. In combination with an animal pen having a masonry floor and wall with a gutter in the floor at the foot of the wall and a recess in the wall and spaced above said floor, a basin in said recess the forward end of which has the greatest depth and is positioned adjacent the forward edge of said recess, an automatic watering mechanism including an animal operable water inlet mechanism in a casing mounted in said recess above said basin, said mechanism including an animal operable pressure plate extending downwardly into the rear portion of said basin to permit visibility of the forward portion of said basin, a pressure operated valve having a stem adapted to be actuated by said pressure plate and said basin is so shaped that when said pressure plate is actuated by an animal said basin will overflow to permit clean fresh water to overflow from said basin into said gutter for the cleaning of said basin.

References Cited in the file of this patent

UNITED STATES PATENTS

| | | |
|---|---|---|
| 324,870 | Miks et al. | Aug. 25, 1885 |
| 824,588 | Ruge et al. | June 26, 1906 |
| 1,082,610 | Shrawder | Dec. 30, 1913 |
| 1,170,453 | Mader | Feb. 1, 1916 |
| 1,246,458 | Philbrook | Nov. 13, 1917 |
| 1,282,886 | Lewis | Oct. 29, 1918 |
| 1,896,615 | Gibbs | Feb. 7, 1933 |
| 2,204,106 | Reedy | June 11, 1940 |
| 2,297,379 | Wise | Sept. 29, 1942 |

FOREIGN PATENTS

| | | |
|---|---|---|
| 13,469 | Sweden | Dec. 14, 1901 |
| 181,825 | Germany | Mar. 2, 1907 |
| 419,018 | Germany | Sept. 26, 1925 |
| 175,579 | Switzerland | May 16, 1935 |
| 180,323 | Switzerland | Jan. 16, 1936 |
| 785,730 | France | May 20, 1935 |